United States Patent Office 3,553,329
Patented Jan. 5, 1971

3,553,329
LIPID-NORMALIZING N-(PHENOXYPHENYL)-SULFAMIDES
Norman A. Nelson, Charlestown Township, Kalamazoo County, and Gary E. Vanden Berg, Texas Township, Kalamazoo County, Mich., assignors to The Upjohn Company, Kalamazoo, Mich., a corporation of Delaware
No Drawing. Continuation-in-part of application Ser. No. 654,081, July 18, 1967. This application Nov. 25, 1968, Ser. No. 778,790
Int. Cl. A01k 27/00
U.S. Cl. 424—321
2 Claims

ABSTRACT OF THE DISCLOSURE

Disclosed are compositions containing lipid-normalizing N-(phenoxyphenyl)sulfamides and pharmaceutically acceptable salts thereof. The active ingredients are prepared by reacting a phenoxyaniline with a suitable sulfamoyl halide.

CROSS-REFERENCE TO RELATED APPLICATION

This application is a continuation-in-part of U.S. Ser. No. 654,081 filed on July 18, 1967.

BACKGROUND OF THE INVENTION

It is recognized that relatively high serum cholesterol and tirglyceride levels are injurious to arterial tissue, and that such injuries may be one of the causes of coronary heart disease and atherosclerosis. It has now been found that the serum lipid level in a mammal, and in particular to cholesterol and the triglyceride levels, can be lowered by administering to the mammal an effective amount of a composition of the present invention.

SUMMARY OF THE INVENTION

These compositions contain an active ingredient which can be represented by the formula (I)
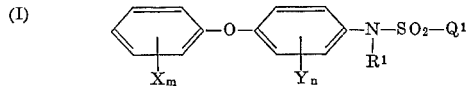

wherein X can be halo, alkyl containing from 1 to 4 carbon atoms, inclusive, or alkoxy containing from 1 to 4 carbon atoms, inclusive; Y can be halo; $R^1$ can be hydrogen, alkyl containing from 1 to 4 carbon atoms, inclusive, 2-piperidinoethyl, 3-piperidinopropyl, 2-(1-pyrrolidinyl)ethyl, 3-(1-pyrrolidinyl)propyl, 2-morpholinoethyl, 3-morpholinopropyl, and dialkylaminoalkyl of the formula

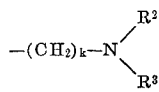

where $R^2$ and $R^3$ can be alike or different and are alkyl containing from 1 to 4 carbon atoms, inclusive; and $Q^1$ can be an amino moiety which is a member of the group consisting of heterocyclic amino moieties such as piperidino, 1-pyrrolidinyl, or morpholino, and amino moieties represented by the formula

where $R^4$ and $R^5$ are alkyl containing from 1 to 4 carbon atoms, inclusive, and are alike or different, and either or both can also be hydrogen when $R_1$ is hydrogen or alkyl. The subscript $k$ is an integer having a value of 2 or 3, the subscript $m$ is an integer having a value of zero to 3, inclusive, and the subscript $n$ is an integer having a value of zero to 2, inclusive; and the corresponding acid addition salts thereof.

DETAILED DESCRIPTION OF THE INVENTION

The compounds represented by Formula I can be prepared by reacting a phenoxyaniline of the type (II)
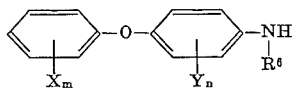

where X, Y, m, and n have the same meaning as above and $R^6$ is hydrogen or alkyl containing from 1 to 4 carbon atoms, inclusive, with a sulfamoyl chloride represented by the formula (III)  Cl—SO₂—Q¹ where $Q^1$ has the same meaning as above.

In Formulas I and II illustrative halo radicals are fluoro, chloro, bromo, and iodo.

Illustrative of the alkyl radicals contemplated herein are methyl, ethyl, propyl, isoupropyl, butyl, isobutyl, sec.-butyl, and tert.-butyl.

Illustrative alkoxy radicals are methoxy, ethoxy, proproxy, isopropoxy, butoxy, isobutoxy, sec.-butoxy, and tert.-butoxy.

The phenoxyanilines represented by Formula II are a known group of compounds, some of which are commercially available.

The sulfamoyl chlorides of Formula III also are a known class of compounds, some of which are commercially available. Methods of preparation can be found in J. Am. Chem. Soc. 61, 3250 (1939); Chem. Ber. 92, 509 (1959); Ann. 624, 25 (1959); and Acta Chem. Scand. 17 (7), 2141 (1963).

The reaction between a phenoxyaniline (II) and a sulfamoyl chloride (III) can be carried out by admixing one or more equivalents of the sulfamoyl chloride with the phenoxyaniline in a suitable reaction medium which is also an acid acceptor for the hydrogen chloride formed during the reaction, such as pyridine, the alkyl-substituted pyridines, N,N-dimethylaniline, the tertiary alkylamines such as triethylamine, trimethylamine, etc., with or without inert cosolvents typified by methylene chloride, diethyl ether, benzene, tetrahydrofuran, or the like. The reaction temperature can range from about 0° C. to about 60° C. Reaction at about room temperature is preferred, however.

The reaction product from the foregoing reaction is the desired N-(phenoxyphenyl)sulfamide (I) in which $R^1$ is hydrogen or alkyl. This reaction product can be isolated from the reaction mixture in conventional manner, e.g., by filtration or extraction into a water-immiscible solvent, followed by washing and drying of the recovered product. If necessary, the product can be purified further by crystallization or by high vacuum distillation.

An N-(phenoxyphenyl)sulfamide (I) where $R^1$ is hydrogen and $Q^1$ is a secondary amino moiety (i.e., has no N-attached hydrogen) can be alkylated by treatment, in an inert organic solvent such as benzene, tetrahydrofuran, or dioxane, with an alkylating agent which can be an alkyl halide or a sec.-aminoalkyl halide. The alkylation takes place in the presence of a base, for example, an alkali metal alkoxide such as potassium tert.-butoxide, or an alkali metal hydride such as sodium hydride or potassium hydride. Reaction temperature for the alkylation reaction can range from about 0° C. to about 100° C. When the alkylating agent is a primary alkyl iodide, room temperature is the preferred reaction temperature; however, for alkyl chlorides a temperature from about 50° C. to about 100° C. is preferred. When sec.-aminoalkyl halides in the form of a hydrohalide salt are employed as the alkylating agent, sufficient base is added to the reaction mixture to liberate the free sec.-aminoalkyl halide and to form the sulfamide alkali metal salt.

The compounds of Formula I where $R^1$ is sec.-aminoalkyl are amines which can exist either in the non-protonated or free-base form, or in the protonated or acid addition salt form, depending on the pH of the environment. Stable, pharmaceutically acceptable, protonates can be formed on neutralization of the free-base form with suitable acids such as hydrogen chloride, hydrogen bromide, sulfuric acid, phosphoric acid, acetic acid, and the like.

The compositions of this invention are useful in mammals as hypocholesterolemic agents and as hypotriglyceridemic agents. The amount of the active ingredient that is to be administered depends on the age, weight, and condition of the recipient, and also on factors such as the frequency and route of administration.

The daily dose range can be from about 0.1 milligram per kilogram of body weight to about 60 milligrams per kilogram of body weight, and preferably from about 2 milligrams per kilogram of body weight to about 60 milligrams per kilogram of body weight.

For injection, the N-(phenoxyphenyl)sulfamides can be administered in the form of a solution, suspension, or emulsion in an aqueous or nonaqueous medium prepared in accordance with methods known in the art. As an aqueous medium, physiological saline or aqueous glucose solutions are preferred. Alternatively, the injectable can also be a suspension of the aforesaid active ingredient in a pharmacologically acceptable mineral oil or vegetable oil, such as corn oil, for example.

For oral administration, the N-(phenoxyphenyl)sulfamides can be administered in tablet, capsule, powder, or fluid form, conventionally admixed with known inert carriers.

For rectal administration, the N-(phenoxyphenyl)sulfamides can be administered in suppository form, prepared using conventional inert carriers and lubricants.

The preferred unit dosage is from about 100 to about 5000 milligrams of the active ingredient usually admixed with a diluent amount of a pharmaceutically acceptable carrier.

The present invention is further illustrated by the following examples.

EXAMPLE I

Preparation of N,N-dimethyl-N'-(p-phenoxyphenyl)-sulfamide

A mixture of p-phenoxyaniline (about 18.5 grams), dimethylsulfamoyl chloride (about 25 milliliters), and pyridine (about 75 milliliters) is stirred at about room temperature for about 3 days. Thereafter water (about 75 milliliters) is added thereto with cooling so as to maintain the mixture at about room temperature.

After addition of water the resulting admixture is permitted to stand for about 1 hour and then poured into ice water (about 500 milliliters) containing concentrated hydrochloric acid (about 80 milliliters). The obtained combined mixture is then extracted with methylene chloride, and the obtained extract washed with dilute aqueous hydrochloric acid solution, dilute aqueous sodium bicarbonate solution, and water. Thereafter the extract is dried and concentrated by evaporation.

The produced residue is crystallized from 95 percent ethanol. About 23.5 grams of a crystalline product melting at 144° C. to 146° C. is obtained. A further recrystallization produces a crystalline product melting at 144° C. to 145° C. The crystalline product is identified as N,N-dimethyl-N'-(p-phenoxyphenyl)sulfamide, obtained in about 80 percent yield.

Analysis for $C_{14}H_{16}N_2O_3S$: Calcd.: C, 57.51; H, 5.52; N, 9.58. Found: C, 57.54; H, 5.59; N, 9.54.

In a manner similar to Example I, but using sulfamoyl chloride in lieu of dimethylsulfamoyl chloride as one of the reactants, the corresponding N-(p-phenoxyphenyl)-sulfamide is prepared:

Using methylsulfamoyl chloride the corresponding N-methyl-N'-(p-phenoxyphenyl)sulfamide is prepared;

Using butylsulfamoyl chloride the corresponding N-butyl-N'-(p-phenoxyphenyl)sulfamide is prepared;

Using dibutylsulfamoyl chloride the corresponding N,N-dibutyl-N'-(p-phenoxyphenyl)sulfamide is prepared;

Using 1-pyrrolidinesulfonyl chloride the corresponding N,N-tetramethylene-N'-(p-phenoxyphenyl)sulfamide is prepared;

Using 1-piperidinesulfonyl chloride the corresponding N,N-pentamethylene-N' - (p-phenoxyphenyl)sulfamide is prepared;

Using 4-morpholinesulfonyl chloride the corresponding N,N-(3-oxapentamethylene) - N' - (p-phenoxyphenyl) sulfamide is prepared; etc.

Similarly, reacting p-(p-chlorophenoxy)aniline with sulfamoyl chloride the corresponding N-(p-chlorophenoxyphenyl)sulfamide is produced;

Reacting 3-chloro-4-phenoxyaniline with dibutylsulfamoyl chloride the corresponding N,N-dibutyl-N'-(3-chloro-4-phenoxyphenyl)sulfamide is produced;

Reacting 1-piperidinesulfonyl chloride with 3,5-diiodo-4-(p-methoxyphenoxy) aniline the corresponding N,N-pentamethylene - N' - [3,5 - diiodo-4-(p-methoxyphenoxy)phenyl]sulfamide is produced;

Reacting 4-morpholinesulfonyl chloride with p-(2,6-dimethoxyphenoxy)-N - isopropylaniline the corresponding N,N - (3-oxapentamethylene) - N' - [4-(2,6-dimethoxyphenoxy)phenyl]sulfamide is produced, etc.

EXAMPLE II

Preparation of N,N-dimethyl-N'-methyl-N'-(p-phenoxyphenyl)sulfamide

N,N-dimethyl-N'-(p-phenoxyphenyl)sulfamide (about 29.2 grams, 0.1 mole) is dissolved in tetrahydrofuran (about 300 milliliters). To the resulting solution is added, successively, potassium tert.-butoxide (about 11.2 grams, 0.1 mole) and methyl iodide (about 30 milliliters).

After the addition is complete, the obtained admixture is stirred for about 6 hours at about room temperature, and thereafter the admixture is concentrated by evaporation in vacuo. The produced residue is then partitioned between diethyl ether and a dilute aqueous potassium hydroxide solution. The obtained ethereal extract is washed with water and dried. Thereafter the diethyl ether is removed by evaporation. The produced residue is N,N-dimethyl - N' - methyl-N' - (p-phenoxyphenyl)sulfamide which can be further purified by crystallization, if desired.

In a manner similar to Example II but using ethyl iodide, the corresponding N,N-dimethyl-N'-ethyl-N'-(p-phenoxyphenyl)sulfamide is prepared;

Using propyl iodide the corresponding N,N-dimethyl-N'-propyl-N'-(p-phenoxyphenyl)sulfamide is prepared;

Using butyl iodide the corresponding N,N-dimethyl-N'-butyl-N'-(p-phenoxyphenyl)sulfamide is prepared, etc.

EXAMPLE III

Preparation of N,N-dimethyl-N'-[2-(diethylamino)-ethyl]-N'-(p-phenoxyphenyl)sulfamide N,N-dimethyl-N'-(p-phenoxyphenyl)sulfamide (about 29.2 grams, 0.1 mole), benzene (about 300 milliliters), N,N-dimethyl - 2 - chloroethylamine hydrochloride (about 17.2 grams, 0.1 mole), and potassium tert.-butoxide (about 22.4 grams, 0.2 mole) are combined and stirred under reflux for about 30 hours. Thereafter the obtained admixture is cooled, diluted with diethyl ether, washed successively with dilute aqueous sodium hydroxide solution and water, and then dried over magnesium sulfate. The dried solution is then concentrated by evaporation. The produced residue is N,N-dimethyl-N'-[2-(diethylamino)ethyl]-N'-(p-phenoxyphenyl)sulfamide which is further purified by crystallization, if desired.

Similar to the procedure set forth above, but using N,N-dibutyl-2-chloroethylamine hydrochloride in lieu of N,N-diethyl-2-chloroethylamine hydrochloride, the corresponding N,N-dimethyl-N'-[2-(dibutylamino)ethyl]-N'-(p-phenoxyphenyl)sulfamide is produced;

Using N,N-diethyl-3-chloropropylamine hydrochloride the corresponding N,N-dimethyl-N'-[3-(diethylamino)propyl]-N'-(p-phenoxyphenyl)sulfamide is produced;

Using N-methyl-N-propyl-3-chloropropylamine hydrochloride the corresponding N,N-dimethyl-N'[3-N-methyl-N-propylamino)-propyl]-N'-(p-phenoxyphenyl)sulfamide is produced;

Using N-(2-chloroethyl)piperidine the corresponding N,N-dimethyl-N'-(2-piperidinoethyl)-N'-(p-phenoxyphenyl)sulfamide is produced;

Using N-(3-chloropropyl)morpholine the corresponding N,N-dimethyl-N'-(3-morpholinopropyl)-N'-(p-phenoxyphenyl)sulfamide is produced, etc.

EXAMPLE IV

Preparation of compressed tablets

A lot of 10,000 scored, compressed tablets, each containing 500 milligrams of N,N-dimethyl-N'-(p-phenoxyphenyl)sulfamide is prepared from the following ingredients:

| | Grams |
|---|---|
| N,N-dimethyl-N'-(p-phenoxyphenyl)sulfamide, micronized | 5000 |
| Dicalcium phosphate | 250 |
| Methylcellulose, USP (15 cps.) | 65 |
| Talc, bolted | 450 |
| Corn starch, dried | 450 |
| Calcium stearate, fine powder | 35 |

The N,N-dimethyl-N'-(p-phenoxyphenyl)sulfamide and dicalcium phosphate are mixed well, granulated with 7.5 percent solution of methylcellulose in water, passed through a No. 8 screen and dried at about 49° C. The dried granules are passed through a No. 12 screen, mixed thoroughly with the talc, starch, and stearate, and compressed into tablets.

EXAMPLE V

Hard gelatin capsules

A lot of 1,000 hard gelatin capsules each containing 250 milligrams of N,N-dimethyl-N'-(p-phenoxyphenyl)sulfamide is prepared from the following ingredients:

| | Grams |
|---|---|
| N,N-dimethyl-N'-(p-phenoxyphenyl)sulfamide, micronized | 250 |
| Starch, dried | 150 |
| Calcium stearate | 2 |
| Talc | 3 |

The starch, talc, stearate, and N,N-dimethyl-N'-(p-phenoxyphenyl)sulfamide are mixed well and the obtained mixture is filled into two-piece hard gelatin capsules.

EXAMPLE VI

Preparation of soft gelatin capsules

A batch of 1,000 soft gelatin capsules, each containing 500 milligrams of N,N-dimethyl-N'-(p-phenoxyphenyl)sulfamide is prepared from the following ingredients:

| | | |
|---|---|---|
| N,N-dimethyl-N'-(p-phenoxyphenyl)sulfamide | gr | 500 |
| Corn oil | | q.s. |

The active ingredient is dispersed in a sufficient amount of corn oil, and then the suspension is filled into soft gelatin capsules by conventional means.

EXAMPLE VII

Aqueous oral suspension

An aqueous oral suspension containing in each tablespoonful (15 ml.) 1200 milligrams of N,N-dimethyl-N'-(p-phenoxyphenyl)sulfamide is prepared from the following materials:

| | | |
|---|---|---|
| N,N-dimethyl-N'-(p-phenoxyphenyl)sulfamide, micronized | gr | 800 |
| Methylparaben USP | gr | 7.5 |
| Propylparaben USP | gr | 2.5 |
| Saccharin sodium | gr | 12.5 |
| Cyclamate sodium | gr | 2.5 |
| Glycerin | ml | 3000 |
| Tragacanth powder | gr | 100 |
| Orange oil flavor | gr | 10 |
| F. D. and C. orange dye | gr | 7.5 |
| Deionized water, q.s. to 10,000 ml. | | |

EXAMPLE VIII

Aqueous suspension for injection

A suspending vehicle is prepared from the following materials:

| | | |
|---|---|---|
| Polyethylene glycol 4000 | gr | 30 |
| Potassium chloride | gr | 11.2 |
| Polysorbate 80 | gr | 2 |
| Methylparaben | gr | 1.8 |
| Propylparaben | gr | 0.2 |
| Water, q.s. to 1000 ml. | | |

The parabens are added to a major portion of the water and are dissolved therein by stirring and heating to about 65° C. The resulting soltuion is cooled to room temperature and the remainder of the ingredients are added thereto and dissolved therein. The balance of the water to make up the desired volume is then added and the solution sterilized by filtration.

The thus prepared sterile vehicle is then mixed with 50 grams of N,N-dimethyl-N'-(p-phenoxyphenyl)sulfamide which has been previously reduced to a particle size of less than about 10 microns and sterilized with ethylene oxide gas. Thereafter the resulting mixture is passed through a sterilized colloid mill and filled under aseptic conditions into sterile containers which are thereafter sealed.

EXAMPLE IX

Suppository

A lot of 1000 suppositories, each containing 375 milligrams of N,N-dimethyl-N'-(p-phenoxyphenyl)sulfamide is prepared from the following ingredients:

| | Grams |
|---|---|
| Polyethylene glycol 4000 | 750 |
| Polyoxyethylene sorbitan monostearate (Tween 61) | 300 |
| Spermaceti | 330 |
| Polyethylene glycol 400 | 320 |
| Ethylene oxide-polypropylene glycol condensation product (Pluronic F–68) | 150 |
| Lactose | 640 |
| Starch, bolted | 135 |
| N,N-dimethyl-N'-(p-phenoxyphenyl)sulfamide, micronized | 375 |

The polyethylene glycol 4000, polyoxyethylene sorbitan monostearate and spermaceti are melted together at 80 to 90° C. The remainder of the ingredients, finely powdered, are dispersed in the polyethylene glycol 400. The dispersion is added to the melted mixture which is stirred at 80 to 90° C. to ensure smoothness. The completed mass is allowed to cool sufficiently, then poured into chilled containers for 24 hours before extrusion to form individual suppositories weighing 3 grams each.

We claim:

1. A composition effective as a hypocholesterolemic and hypotriglyceridemic agent containing as an active ingredient from about 100 to about 5000 milligrams of an N-(phenoxyphenyl)sulfamide represented by the formula

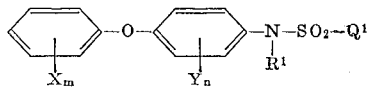

wherein X is a member of the group consisting of halo, alkyl containing from 1 to 4 carbon atoms, inclusive, and alkoxy containing from 1 to 4 carbon atoms, inclusive; Y is halo; $R^1$ is a member of the group consisting of hydrogen, alkyl containing from 1 to 4 carbon atoms, inclusive, and secondary-aminoalkyl selected from the group consisting of 2-piperidinoethyl, 3-piperidinopropyl, 2-(1-pyrrolidinyl)ethyl, 3-(1-pyrrolidinyl)propyl, 2-morpholinoethyl, 3-morpholinopropyl, and dialkylaminoalkyl of the formula

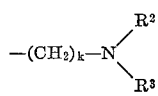

where $R^2$ and $R^3$ can be alike or different and are alkyl containing from 1 to 4 carbon atoms, inclusive; $Q^1$ is an amino moiety which is a member of the group consisting of heterocyclic amino moieties selected from the group consisting of piperidino, 1-pyrrolidinyl, and morpholino, and amino moieties represented by the formula $$-N\begin{matrix}R^4\\R^5\end{matrix}$$

where $R^4$ and $R^5$ can be alike or different and are hydrogen or alkyl containing from 1 to 4 carbon atoms, inclusive, with the proviso that when $R^1$ is secondary-aminoalkyl, $Q^1$ is a secondary amino moiety; $m$ is an integer having a value of zero to 3, inclusive; $n$ is an integer having a value of zero to 2, inclusive; and $k$ is an integer having a value from 2 to 3, inclusive; and the corresponding pharmaceutically acceptable acid addition salts; together with a diluent amount of a pharmaceutically acceptable carrier.

2. A composition in accordance with claim 1 wherein the active ingredient is N,N-dimethyl-N'-(p-phenoxyphenyl)sulfamide.

References Cited
UNITED STATES PATENTS 3,223,547 12/1965 Bindler et al. _____ 424—321
3,223,582 12/1965 Bindler et al. _____ 424—321

ALBERT T. MEYERS, Primary Examiner

N. A. DREZIN, Assistant Examiner

U.S. Cl. X.R.

424—248, 267, 274, 325

UNITED STATES PATENT OFFICE
CERTIFICATE OF CORRECTION

Patent No. 3,553,329                    Dated Jan. 5, 1971

Inventor(s) Norman A. Nelson and Gary E. VandenBerg

It is certified that error appears in the above-identified patent and that said Letters Patent are hereby corrected as shown below:

Column 1, line 30, for "tirglyceride" read --triglyceride-- Column 1, line 34, for "particular to cholesterol" read --particular the cholesterol--. Column 4, line 70, for "dimethyl" read --diethyl--. Column 5, line 15, for "N'[3-N-" read -- N'-[3-(N- --. Column 6, line 33, for "soltuion" read --solution--.

Signed and sealed this 11th day of May 1971.

(SEAL)
Attest:

EDWARD M. FLETCHER, JR.
Attesting Officer

WILLIAM E. SCHUYLER, JR
Commissioner of Patent